(12) United States Patent
Dehganpour et al.

(10) Patent No.: US 11,734,135 B2
(45) Date of Patent: Aug. 22, 2023

(54) PROCESSOR HEALTH MONITORING WITH FAILBACK BASED ON TIMESTAMPS

(71) Applicant: Capital One Services, LLC, McLean, VA (US)

(72) Inventors: Reza Dehganpour, Fairfax, VA (US); Thuc Vu, McLean, VA (US); Dhairyasheel B. Patil, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/472,798

(22) Filed: Sep. 13, 2021

(65) Prior Publication Data

US 2021/0406142 A1    Dec. 30, 2021

Related U.S. Application Data

(63) Continuation of application No. 16/814,016, filed on Mar. 10, 2020, now Pat. No. 11,151,003.

(51) Int. Cl.
*G06F 11/00*    (2006.01)
*G06F 11/20*    (2006.01)
*G06F 11/34*    (2006.01)
*G06F 11/30*    (2006.01)

(52) U.S. Cl.
CPC ...... *G06F 11/2028* (2013.01); *G06F 11/3024* (2013.01); *G06F 11/3495* (2013.01); *G06F 2201/805* (2013.01)

(58) Field of Classification Search
CPC ............. G06F 11/2028; G06F 11/2038; G06F 11/2097; G06F 11/2048
See application file for complete search history.

(56) References Cited

U.S. PATENT DOCUMENTS

| | | | |
|---|---|---|---|
| 7,788,537 B1 * | 8/2010 | Yellen | G06F 11/079 714/38.11 |
| 9,274,906 B2 | 3/2016 | Calder et al. | |
| 9,639,439 B2 | 5/2017 | Laicher et al. | |
| 10,409,697 B2 | 9/2019 | Chen et al. | |

(Continued)

OTHER PUBLICATIONS

U.S. Appl. No. 16/814,016, "Processor Health Monitoring and Auto Failover and Failback of a Streaming System Using a Timestamp", to Reza Dehganpour, filed Mar. 10, 2020, pp. 1-48.

*Primary Examiner* — Charles Ehne
(74) *Attorney, Agent, or Firm* — Sterne, Kessler, Goldstein & Fox P.L.L.C.

(57) ABSTRACT

Disclosed herein are system, method, and computer program product embodiments for a processor health monitoring system. An embodiment operates by determining that a plurality of messages are transmitted to both a primary processor and a recovery processor. A functional health of the primary processor is monitored based on one or more metrics, and a failure event is detected at the primary processor based on the one or more metrics. A timestamp of a first message of the plurality of messages is identified, the first message having been successfully processed by the primary processor prior to the failure event. The timestamp of the first message is provided to the recovery processor, wherein the recovery processor is configured to actively process the plurality of messages from the timestamp of the first message. The primary processor is deactivated.

18 Claims, 4 Drawing Sheets

(56) References Cited

U.S. PATENT DOCUMENTS

| | | |
|---|---|---|
| 10,461,996 B2 | 10/2019 | Griswold et al. |
| 10,506,038 B1 | 12/2019 | Patel et al. |
| 2014/0229606 A1 | 8/2014 | Griswold et al. |
| 2015/0006953 A1 | 1/2015 | Holbrook et al. |
| 2018/0121301 A1* | 5/2018 | Murphy ................ G06F 3/0673 |
| 2019/0034303 A1* | 1/2019 | Anderson ........... G06F 12/0842 |

* cited by examiner

PROCESSOR HEALTH MONITORING WITH FAILBACK BASED ON TIMESTAMPS

CROSS-REFERENCE TO RELATED APPLICATIONS

The application is a continuation of U.S. patent application Ser. No. 16/814,016, titled "Processor Health Monitoring and Auto Failover and Failback of a Streaming System Using a Timestamp," filed on Mar. 10, 2020, which is herein incorporated by reference in its entirety.

BACKGROUND

Maintaining system uptime is an important aspect of computing systems. When processors fail, a system should be able to continue operating without interrupting ongoing business processes or delaying consumer demands. However, to achieve continual processing capabilities, system designers often face a tradeoff between maintaining system redundancy (that may be used in cases of failure) and wasting processing resources which are being used to achieve the redundancy but are not being utilized during system uptime. These redundant systems use human intervention to implement the failover, and often require maintaining backup databases for tracking purposes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a processor health monitoring and failover system using a timestamp.

Rather than maintaining a separate database that uniquely generates and assigns identifiers to various incoming messages or detected events, in an embodiment, the system described herein may use timestamps in failover and failback processing. By monitoring system health based on timestamps, the system described herein may be able to achieve automatic failover and failback processing without incurring the extra overhead and potential bottleneck that may result from assigning unique event or message identifiers.

Figure 1:
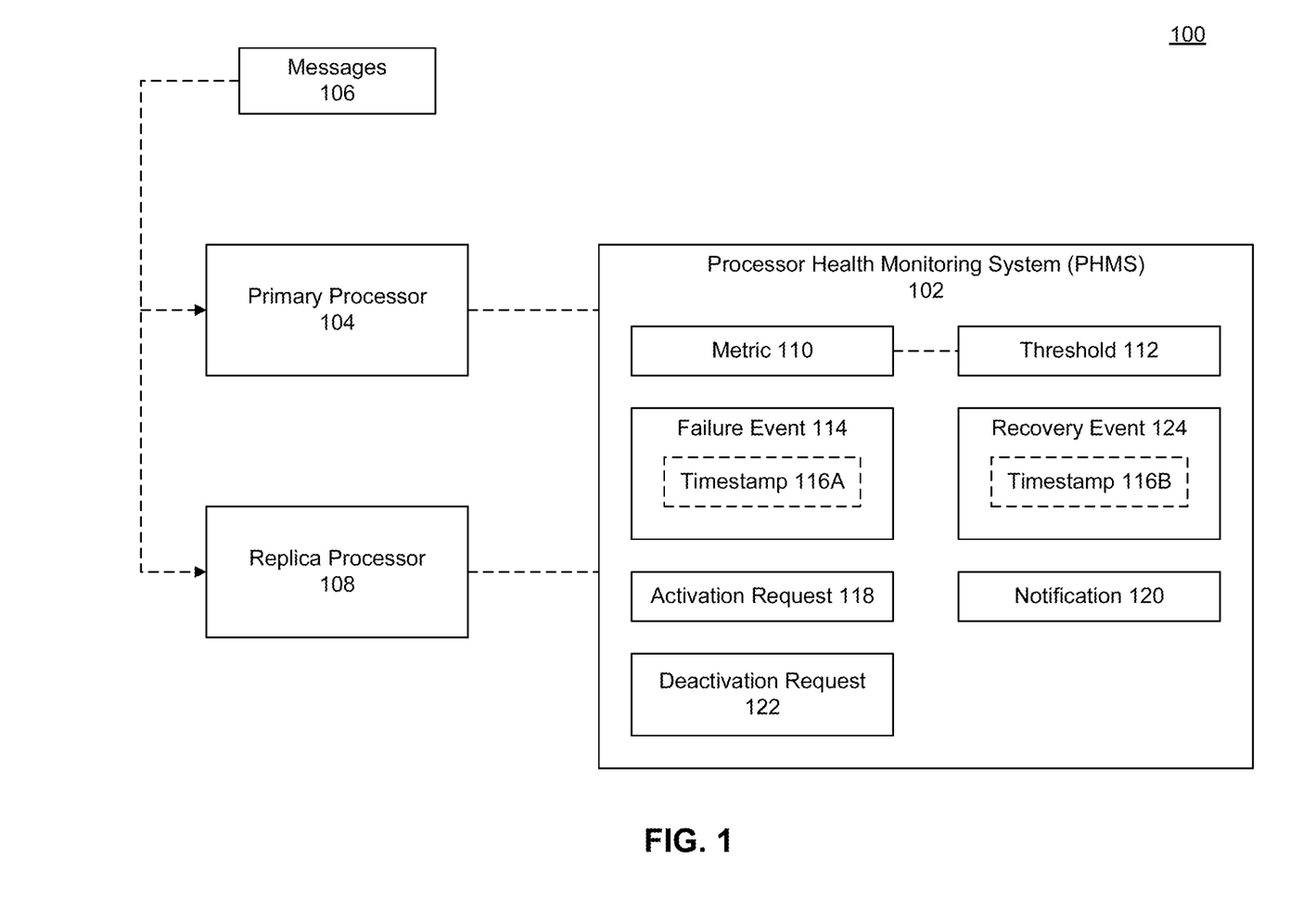
FIG. 1 is a block diagram illustrating example functionality for providing a processor health monitoring and failover system, according to some embodiments.

FIG. 1 is a block diagram 100 illustrating example functionality for providing a processor health monitoring and failover system, according to some embodiments. In the example of FIG. 1, the processor health and monitoring system (PHMS) 102 may perform both processor health monitoring, and failover and failback functionality without message loss. PHMS 102 may maintain system uptime while maximizing or improving resource usage without unnecessarily wasting processing resources which may not be actively utilized during normal system uptime operations.

A primary processor 104 may receive messages 106 for processing. In an embodiment, the messages 106 may be received as a stream of messages. Primary processor 104 may include a device, application, web service, or other program or computing system configured to receive and process data processing requests or messages 106. In an embodiment, message 106 may include an email, application programming interface (API) request, or other electronic communication provided between two computing devices to perform an action. For example, messages 106 may include fraud alerts that are received from another computing system, which are to be processed by primary processor 104 to determine what actions are to be taken relative to each fraud alert or message 106. Other example messages 106 may include other data retrieval and/or processing tasks or requests.

A replica processor 108 may include a back-up or standby processor, application, device, or system that may be used in case of failure or slowdown of primary processor 104. For example, replica processor 108 may be configured to execute all (or a subset) of the applications executing on primary processor 104 when it is activated or the appropriate computing resources, network bandwidth, etc. are allocated to it—in the case of a failure of primary processor 104.

In an embodiment, replica processor 108 may be placed into an inactive or standby mode without the necessary resources allocated to execute some or part of the applications, so as to not consume processing or other resources while not be being used. While replica processor 108 is inactive, other applications may have access to the memory, processor, computing cycles, or other computing resources that are not being utilized by replica processor 108 to maintain the standby mode. In an embodiment, replica processor 108 may not be activated while primary processor 104 is actively receiving and processing messages 106 in a healthy state (as determined by PHMS 102).

PHMS 102 may continuously or periodically monitor the health or status of primary processor 104 to detect when there may be a problem or potential problem with primary processor 104, and determine when to allocate the resources necessary to activate replica processor 108 to avoid potential system downtime or slowdown. In an embodiment, PHMS 102 may monitor primary processor 104 (which may include multiple different devices operating asynchronously) based on a number of different metrics 110 to determine a state or health of primary processor 104.

Metrics 110 may include any objective statistics or features that may be monitored, measured, or retrieved which may signal or be used to determine a state of available processing power, operational capacity, bandwidth, workload, or other status; any of which together or separately may be used to determine or define system health of primary processor 104. In an embodiment, metrics 110 may be based on a service level agreement (SLA). An SLA may define business requirements that primary processor 104 is designed, configured, or expected to fulfill. An example SLA metric 110 may be the number of messages primary processor 104 processes per hour, or how long it takes between receiving and completing processing of an incoming request or message 106.

Another example metric 110 may include monitoring one or more applications that are processing messages 106 on primary processor 104, for delays, exceptions, or errors. If the messages 106 are not being processed as expected, and a processing application is producing delays, errors, or exceptions, this may signal that there is a problem with primary processor 104 or one or more applications operating on the primary processor 104. An example metric 110 may indicate that if more than two or more errors are generated per hour (e.g., threshold 112), there is a problem with the system health of primary processor 104, which may trigger a failure event 114.

Another example metric 110 may include monitoring the time it takes for primary processor 104 to process one or more messages 106. In an embodiment, the SLA may indicate that new messages 106 must be processed within two hours of receipt. PHMS 102 may then mark the two hours as a threshold value 112 for a processing message metric 110. PHMS 102 may track or monitor the time between the receipt of a message 106 by using timestamps.

For example, an incoming message 106 may be assigned a timestamp indicating its date and time of receipt. In an embodiment, the timestamp may be a time when the streaming or incoming message 106 is produced at a source or producing system, or at ingestion time when the message 106 is received by the streaming processor. Then, for example, any output or result from message processing, may also be assigned its own timestamp. If the difference between the beginning timestamp and the ending timestamp begins increasing towards the threshold value 112, or exceeds the two-hour threshold 112, then that may signal to PHMS 102 that there is a failure event 114 that has occurred. In an embodiment, the failure event 114 may be signaled if the time reaches ninety minutes (e.g., threshold 112), rather than waiting until the two-hour requirement is exceeded.

In an embodiment, PHMS 102 may monitor multiple different metrics 110 with various threshold values 112 to determine the state or health of primary processor 110. In an embodiment, the normal operational state of primary processor 104 may indicate a healthy state and no further action (other than continued operations by primary processor 104 and continued or periodic monitoring by PHMS 102) may be taken.

However, once one or more metrics 110 drop below (or exceed) their respective thresholds 112, such that a healthy system state is no longer detected, PHMS 102 may detect or signal a failure event 114. Upon detecting failure event 114, PHMS 102 may also identify or generate a timestamp 116A indicating when the failure event 114 was detected.

In an embodiment, the timestamp 116A (of failure event 114) may correspond to the timestamp of a message 106 associated with the failure event 114. For example, timestamp 116A may be the timestamp of the most recently successfully processed message 106 that was processed prior to the detection of the failure event 114. Or, for example, if multiple messages 106 are being processed simultaneously when failure event 114 is detected, timestamp 116A may be the timestamp of the message 106 with the earliest timestamp (amongst the messages 106 being processed upon detection of failure event 114). In another embodiment, the failure event 114 may be assigned its own timestamp 116A based upon its detection, irrespective of the timestamps of any messages 106 that have been or are being processed.

As noted above, in an embodiment, rather than generating and assigning additional identifiers to each message 106, primary processor 104 may use a timestamp to track which messages 106 have or have not been processed. Using the timestamp mechanism, rather than assigning identifiers, enables PHMS 102 to achieve redundancy through replica processor 108 without setting up and maintaining a separate database used to determine which messages and which identifiers have been received. Because such a database may then need to be accessed by an application that is used to process messages 106, and may become a bottleneck in case of a slowdown or failure of the database.

Rather than maintaining a separate message database, incoming messages 106 (which may include one or more streams of messages 106) may be assigned a timestamp, and may be transmit to both primary processor 106 and replica processor 108. However, during healthy operations, only primary processor 104 may be actively processing the incoming messages 106, while duplicates of the messages 106 with their assigned timestamps may be stored at a device, database, or storage location of a streaming platform that is accessible to replica processor 108. However, as noted above, there is no central database that is assigning identifiers to the incoming messages 106 or events. In an embodiment, the cache of messages received by replica processor 108 may occasionally be cleared when corresponding messages 106 are fully processed and outputs are returned by primary processor 104.

However, upon detection of a failure event 114, PHMS 102 may send an activation request 118 with failure timestamp 116A to replica processor 108 to allocate the resources necessary and/or to activate replica processor 108. Replica processor 108 may then begin actively processing messages 106 with an assigned timestamp that is equal to or after failure timestamp 116A.

In an embodiment, activation request 118 may trigger replica processor 108 (or another processor or computing system) to retrieve or allocate computing resources necessary to boot up and activate replica processor 108, including one or more applications thereon that may be used for processing messages 106 in a similar or identical manner as primary processor 104. Upon boot up or activation, replica processor 108 may begin processing messages with a timestamp at or after timestamp 116A.

By waiting until a failure event 114 and activation request 118 are detected and transmit to boot up or activate the programs of replica processor 108 necessary for processing messages 106, the overall system resource usage is minimized. Those processing resources of replica processor 108 may be used or allocated to one or more other systems or processes while replica processor 108 is inactive.

In an embodiment, PHMS 102 may also send a notification 120 to an administrator or technician to alert them to the failure event 114. The notification 120 may be a page, phone call, text message, social media message, email, or other form of electronic communication. Notification 120 may be sent prior to, simultaneously with, or after activation request 118.

In an embodiment, PHMS 102 may send a deactivation request 122 to primary processor 104 to prevent resources from being consumed by both primary processor 104 and replica processor 108 in processing the same message 106—which may also potentially avoid confusion. The activation request 118 and deactivation request 122 may both ensure that no messages 106 are lost due to a declining health of primary processor 104, and reduce the amount of computing resources consumed by limiting or eliminating redundancy in both primary processor 104 and replica processor 108 processing the same messages 106 simultaneously.

In an embodiment, deactivation request 122 may block primary processor 104 from outputting or returning the results of message processing (rather than deactivating primary processor 104 completely). Blocking any output may prevent any confusion from a system that is receiving output from replica processor 108 from also receiving an output from primary processor 104 for the same message 106. In an embodiment, deactivation request 122 may be transmitted after an acknowledgement is received that replica processor 108 is up and running and has begun message processing.

After deactivation request 122, PHMS 102 may continue monitoring the state or health of primary processor 104 (based metrics 110 and thresholds 112) to determine when a recovery event 124 has occurred. During this post-failure monitoring, PHMS 102 may monitor the same or different metrics 110 to determine when primary processor 104 has return to a healthy state to resume message processing. For example, if a particular metric 110 falling below a threshold 112 signals a failure event 114, then the same metric 110 exceeding the threshold 112 (after the activation or occurrence of a failure event 114), may signal a recovery event 124.

In an embodiment, the metrics 110 may need to exceed the threshold 112 for an extended or specified period of time before a recovery event 124 is signaled. For example, if PHMS 102 determines the health of primary processor 104 at the end of each minute, then PHMS 102 may require that the metric 110 exceeds threshold 112 for three consecutive periods or minutes. This consistency over multiple monitoring periods may prevent constant switching back and forth, activating and deactivating, between primary processor 104 and replica processor 108.

In an embodiment, an administrator may alternatively manually signal a recovery event 124 after primary processor 104 has been repaired. Recovery event 124 may indicate that primary processor 104 is able to resume message 106 processing.

Upon detecting recovery event 124, PHMS 102 may identify or generate a corresponding timestamp 116B. Timestamp 116B may be generated based on the message processing of replica processor 108 in a similar manner as described above with respect to timestamp 116A and primary processor 104, or based upon the detection of metrics 110 exceeding threshold 112.

Upon detection of recovery event 124, recovery timestamp 116B may be provided to primary processor 104 with activation request 118, indicating primary processor 104 is now enabled to process and provide output to messages 106 beginning at timestamp 116B.

PHMS 102 may also automatically provide a deactivation request 122 to replica processor 108. The deactivation request 112 may cause a computing system to shut down, put into a sleep mode, or otherwise deactivate the resources allocated to replica processor 108. Those processing resources may then be made available to other processes that may be operating. In an embodiment, replica processor 108 may continue processing any messages 106 with a timestamp prior to recovery timestamp 116B, and move into a standby or inactive state after the messages meet or exceed recovery timestamp 116B.

Figure 2:
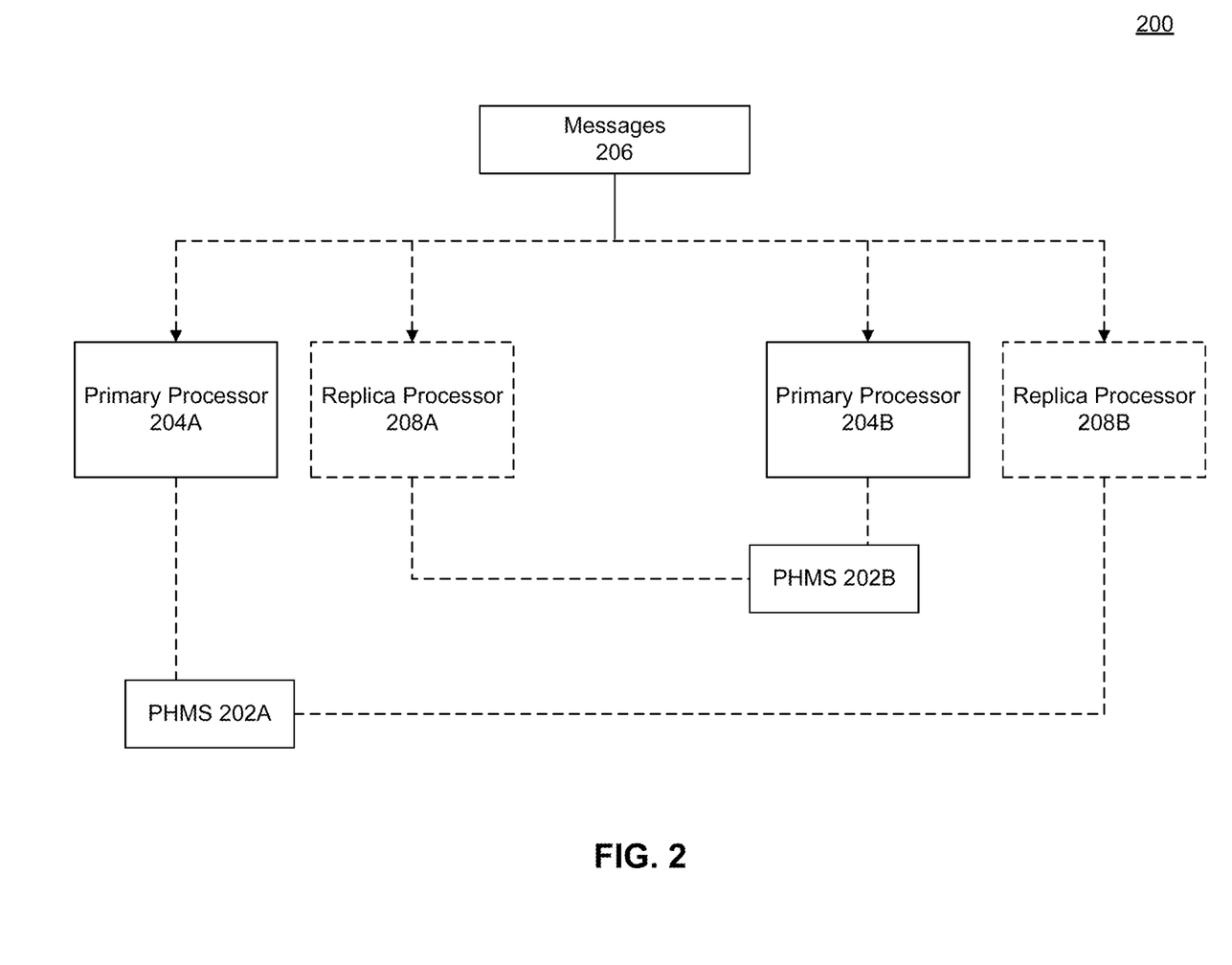
FIG. 2 is a block diagram illustrating another example processor health and monitoring system, according to some embodiments.

FIG. 2 is a block diagram 200 illustrating another example processor health and monitoring system (PHMS) 202, according to some embodiments. Messages 206 may be received, assigned timestamps, and transmit to either primary processor 204A or primary processor 204B. In an embodiment, the allocation of messages 106 between primary processors 204A and 204B may be decided by another system or process. For example, a system from which messages 206 are received may determine the allocation of messages 206 between the primary processors 204A, 204B—which may be unevenly distributed.

In an embodiment, primary processors 204A and 204B may be part of different computing systems or regions that are configured to perform similar or at least partly overlapping processing tasks with regard to messages 106. For example, an organization or company may divide its operations into an east coast operations center (e.g., primary processor 208B) and a west coast operations center (e.g., primary processor 204B). Each center may operate independently of the other, and may include multiple different computing devices or processing locations.

The different operating centers may also include replica processor 208A, 208B. However, rather than each operating center hosting its own replica processor 208, each operating center may host a replica server 208 for a different operating center. For example, replica processor 208A may be activated if a failure event 114 is detected with regard to primary processor 204B. Similarly, replica processor 208B may be activated if a failure event 114 is detected with regard to primary processor 204A. So, for example, a message 206 transmit to primary processor 204B may also be transmit to replica processor 208A. Similarly, a message 206 received by or transmit to primary processor 204A may also be transmit to replica processor 208B.

Geographically dividing the location of replica servers 208 relative to the primary servers 204 they are backing up may provide the advantage of providing a backup in case of disaster. For example, if there is a natural disaster or power outage at the east coast operations, then primary processor 204A may no longer be functional, however, replica processor 208B (which may be geographically located outside of the zone of power failure) may be able to take over message processing during the primary processor 204A downtime.

In an embodiment, each primary processor 204A, 204B may include its own monitoring PHMS 202A, 202B. PHMS 202, as described above, may be configured to monitor the health of one or more processors based on a set of metrics 110 and thresholds 112. In an embodiment, the metrics 110 and thresholds 112 used to monitor primary processor 204A may vary from the metrics 110 and thresholds 112 used to monitor primary processor 204B. In an embodiment, a single PHMS 202A may monitor the health of multiple primary servers 204 and coordinate with multiple replica processors 208B located across various different geographic locations.

Figure 3:
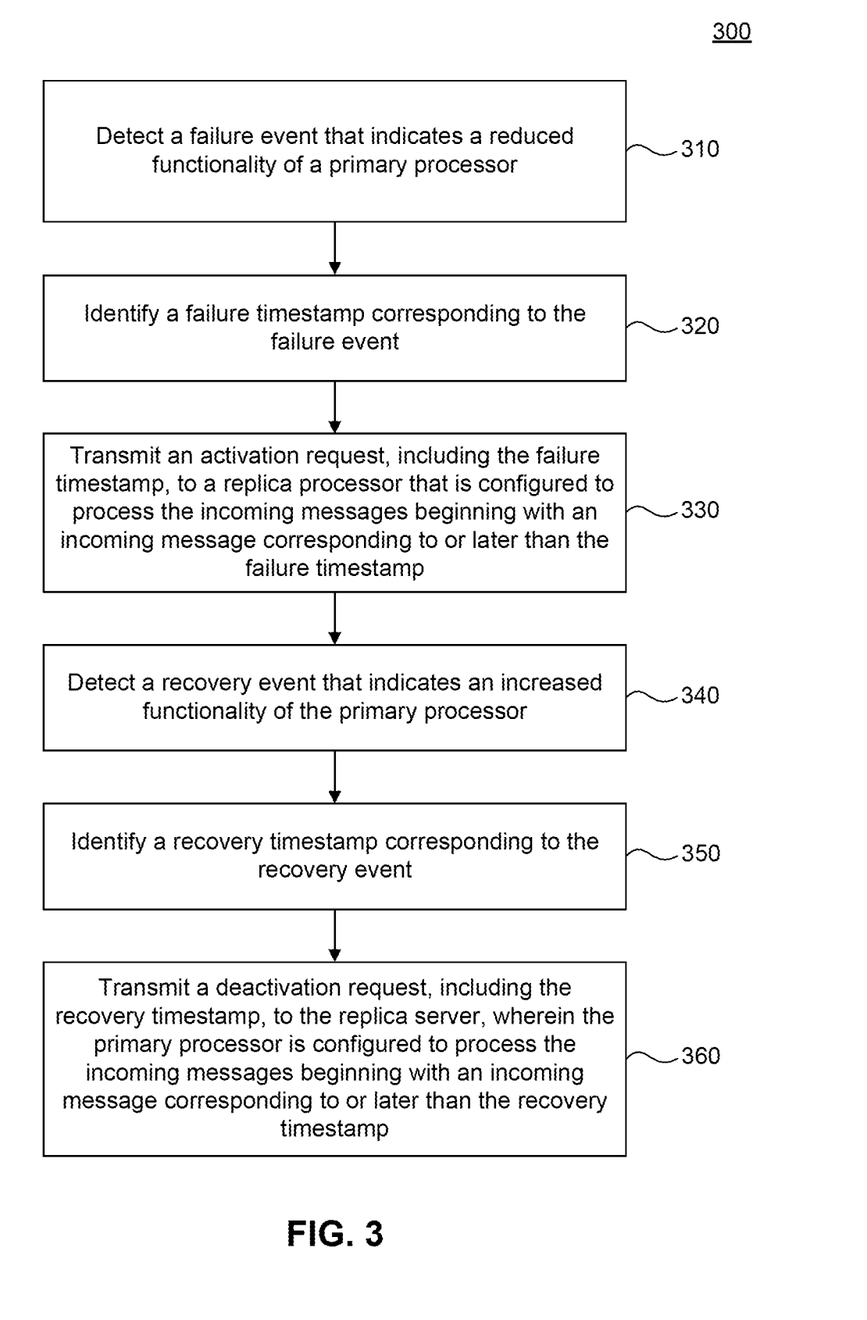
FIG. 3 is a flowchart illustrating example operations of a system for providing processor health and monitoring functionality, according to some embodiments.

FIG. 3 is a flowchart 300 illustrating example operations of a system for providing processor health and monitoring functionality, according to some embodiments. Method 300 can be performed by processing logic that can comprise hardware (e.g., circuitry, dedicated logic, programmable logic, microcode, etc.), software (e.g., instructions executing on a processing device), or a combination thereof. For example, various steps in method 300 may be performed using one or application programming interfaces (APIs) operating on one or more processing devices. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a failure event that indicates a reduced functionality of a primary processor is detected. For example, PHMS 102 may monitor the health of primary processor 104 based on a set of metrics 1102 and corresponding thresholds 112 as primary processor 102 is receiving and processing incoming messages 106.

In 320, a failure timestamp corresponding to the failure event is identified. For example, PHMS 102 may detect when a particular statistic about the performance of primary processor 104 (during message processing) drops below a threshold value 112. Based on the drop in performance, PHMS 102 may signal a failure event 114 that indicates a slowdown or possible problem with primary processor 104

In 330, an activation request, including the failure timestamp, is transmitted to a replica processor that is configured to process the incoming messages beginning with an incoming message corresponding to or later than the failure timestamp. For example, PHMS 102 may identify and assign a timestamp 116A to a time when failure event 114 occurs or is detected. PHMS 102 may then transmit an activation request 118 with the failure timestamp 116A to activate a replica processor 108. Once replica processor 108 has been assigned the necessary resources and is up and running, replica processor 108 may begin processing messages 106 beginning at the failure timestamp 116A. In an embodiment, PHMS 102 may monitor replica processor 108 or may receive an acknowledgement from replica processor 108 that it has begun message processing.

In an embodiment, replica processor 108 may process one or more messages 106 that have previously been processed. For example, a message 106 may be marked with an event timestamp at a source system, and may be late in arriving. The late arriving message may have a smaller timestamp than the failure timestamp 116A, then the message may be processed twice. In such an embodiment, replica processor 108 may need to take appropriate action to retain idempotency in case such an overlap exists.

In an embodiment, PHMS 102 may also deactivate primary processor 104 by transmitting a deactivation request 122. The deactivation request 122 may either pause/stop primary processor 104 from processing any more incoming messages 106, or may block any output from being transmit to a client or requesting system.

In 340, a recovery event that indicates an increased functionality of the primary processor is detected. For example, PHMS 102 may continue receiving data statistics about the operational capacity of primary processor 104 after the failure event 114 has been detected. In an embodiment, primary processor 104 may be assigned a batch of messages 106 which are monitored to determine if a set of recovery metrics 110 and thresholds 112 are exceeded (which may be the same or different metrics 110 and thresholds 112 that were used to detect the failure event 114). Once metrics 110 exceed threshold 112 indicating that the primary processor 104 is up and running, and in a healthy state, a recovery event 124 may be signaled.

In 350, a recovery timestamp corresponding to the recovery event is identified. For example, PHMS 102 may assign a recovery timestamp 116B to the signaling or detection of the recovery event 124. The recovery event 124 may signal a failback event.

In 360, a deactivation request, including the recovery timestamp, is transmitted to the replica server. For example, the recovery timestamp 116B may be transmit to primary processor 104 with an activation request 118. Then, for example, primary processor 104 may begin processing messages 106 beginning with messages 106 that have an incoming timestamp at or later than recovery timestamp 116B. In an embodiment, once PHMS 102 detects that primary processor 104 is processing messages 106 again, a deactivation request 122 may be transmitted to shut down, deactivate, or deallocate resources from replica processor 108. Those freed replica processor 108 resources may then be allocated or used by other system processes.

Figure 4:
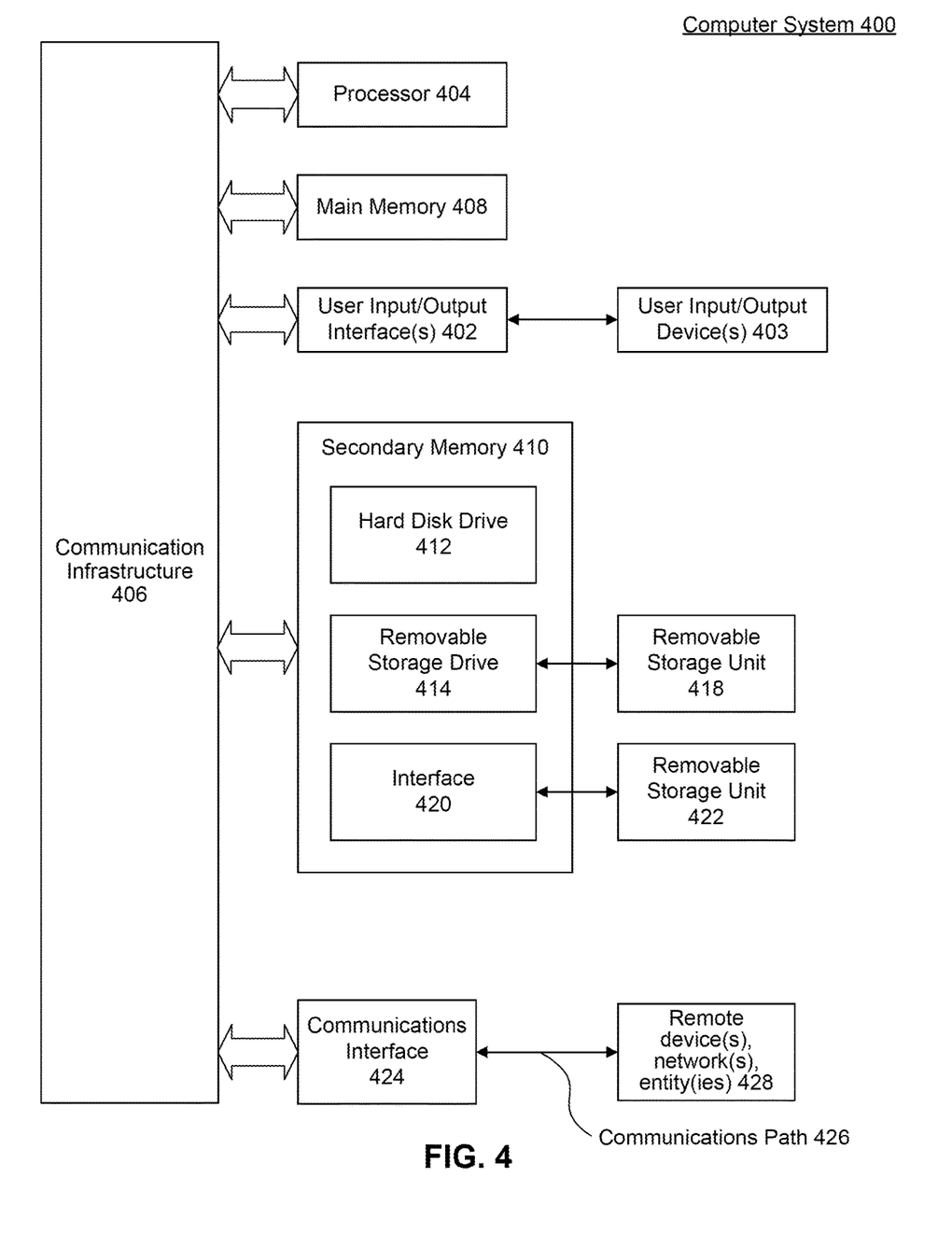
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   determining that a plurality of messages are transmitted to both a primary processor and a recovery processor, wherein the recovery processor is inactive while the primary processor is actively processing the plurality of transmitted messages;
   monitoring a functional health of the primary processor based on one or more metrics; detecting a failure event at the primary processor based on the one or more metrics
   detecting a failure event at the primary processor based on the one or more metrics, wherein the primary processor is configured to continue to process the plurality of messages after the failure event and prior to deactivating:
   identifying a timestamp of a first message of the plurality of messages, wherein the first message was successfully processed by the primary processor prior to the failure event;

providing the timestamp of the first message to the recovery processor, wherein the recovery processor is configured to actively process the plurality of messages from the timestamp of the first message; and deactivating the primary processor.

2. The method of claim 1, further comprising:

receiving an acknowledgment from the recovery processor responsive to providing the timestamp, wherein the deactivating is performed after receiving the acknowledgement.

3. The method of claim 1, wherein the one or more metrics comprise a number of errors by the primary processor as detected over a threshold period of time.

4. The method of claim 1, wherein the timestamp identifies and distinguishes the first message from the plurality of messages.

5. The method of claim 1, wherein the first message was a most recently and successfully processed message, as processed by the primary processor, prior to the failure event.

6. The method of claim 1, further comprising:

determining, based on the one or more metrics, a recovery event indicating that the functional health of the primary processor has improved and the primary processor is ready to resume processing messages after the deactivating; and transmitting an activation request to the primary processor.

7. The method of claim 1, wherein at least one of the one or more metrics comprises a number of exceptions produced by the primary processor processing incoming messages within a specified time interval.

8. The method of claim 1, wherein the timestamp for a first message of the plurality of messages is an identifier for the first message.

9. A system, comprising:

a memory; and at least one processor coupled to the memory and configured to perform operations comprising:

determining that a plurality of messages are transmitted to both a primary processor and a recovery processor, wherein the recovery processor is inactive while the primary processor is actively processing the plurality of transmitted messages;

monitoring a functional health of the primary processor based on one or more metrics; detecting a failure event at the primary processor based on the one or more metrics;

detecting a failure event at the primary processor based on the one or more metrics;

identifying a timestamp of a first message of the plurality of messages, wherein the first message was successfully processed by the primary processor prior to the failure event;

providing the timestamp of the first message to the recovery processor, wherein the recovery processor is configured to actively process the plurality of messages from the timestamp of the first message; and deactivating the primary processor.

10. The system of claim 9, the operations further comprising:

receiving an acknowledgment from the recovery processor responsive to providing the timestamp, wherein the deactivating is performed after receiving the acknowledgement.

11. The system of claim 9, wherein the one or more metrics comprise a number of errors by the primary processor as detected over a threshold period of time.

12. The system of claim 9, wherein the timestamp identifies and distinguishes the first message from the plurality of messages.

13. The system of claim 9, wherein the first message was a most recently and successfully processed message, as processed by the primary processor, prior to the failure event.

14. The system of claim 9, the operations further comprising:

determining, based on the one or more metrics, a recovery event indicating that the functional health of the primary processor has improved and the primary processor is ready to resume processing messages after the deactivating; and transmitting an activation request to the primary processor.

15. The system of claim 9, wherein at least one of the one or more metrics comprises a number of exceptions produced by the primary processor processing incoming messages within a specified time interval.

16. A non-transitory computer-readable medium having instructions stored thereon that, when executed by at least one computing device, cause the at least one computing device to perform operations comprising:

a memory; and at least one processor coupled to the memory and configured to perform operations comprising:

determining that a plurality of messages are transmitted to both a primary processor and a recovery processor, wherein the recovery processor is inactive while the primary processor is actively processing the plurality of transmitted messages;

monitoring a functional health of the primary processor based on one or more metrics; detecting a failure event at the primary processor based on the one or more metrics;

identifying a timestamp of a first message of the plurality of messages, wherein the first message was successfully processed by the primary processor prior to the failure event;

providing the timestamp of the first message to the recovery processor, wherein the recovery processor is configured to actively process the plurality of messages from the timestamp of the first message; and deactivating the primary processor.

17. The non-transitory computer-readable medium of claim 16, the operations further comprising:

receiving an acknowledgment from the recovery processor responsive to providing the timestamp, wherein the deactivating is performed after receiving the acknowledgement.

18. The non-transitory computer-readable medium of claim 16, wherein the one or more metrics comprise a number of errors by primary processor as detected over a threshold period of time.

* * * * *